US008639701B1

(12) United States Patent
Lim et al.

(10) Patent No.: US 8,639,701 B1
(45) Date of Patent: Jan. 28, 2014

(54) LANGUAGE SELECTION FOR INFORMATION RETRIEVAL

(75) Inventors: Yew Jin Lim, Cupertino, CA (US); Alexandre Kojoukhov, San Francisco, CA (US); Hui Tan, Mountain View, CA (US); Maureen Heymans, San Francisco, CA (US); Jeffrey Chin, Sugar Land, TX (US); Sung-Jung Cho, Seoul (KR)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/300,435

(22) Filed: Nov. 18, 2011

Related U.S. Application Data

(60) Provisional application No. 61/416,721, filed on Nov. 23, 2010.

(51) Int. Cl.
*G06F 17/30* (2006.01)

(52) U.S. Cl.
USPC .......................................................... 707/748

(58) Field of Classification Search
USPC .......................................................... 707/748
See application file for complete search history.

(56) References Cited

U.S. PATENT DOCUMENTS

| | | | |
|---|---|---|---|
| 6,064,951 A | 5/2000 | Park et al. | |
| 6,321,189 B1 | 11/2001 | Masuichi et al. | |
| 6,321,191 B1 | 11/2001 | Kurahashi | |
| 6,347,315 B1 | 2/2002 | Kiyoki et al. | |
| 6,360,196 B1 | 3/2002 | Poznanski et al. | |
| 6,381,598 B1 | 4/2002 | Williamowski et al. | |
| 6,594,654 B1 | 7/2003 | Salam et al. | |
| 7,107,204 B1 | 9/2006 | Liu et al. | |
| 7,640,236 B1 | 12/2009 | Pogue | |
| 7,720,856 B2 | 5/2010 | Goedecke et al. | |
| 2001/0029455 A1 | 10/2001 | Chin et al. | |
| 2002/0007384 A1 | 1/2002 | Ushioda et al. | |
| 2004/0006560 A1 | 1/2004 | Chan et al. | |
| 2005/0209844 A1 | 9/2005 | Wu et al. | |

(Continued)

FOREIGN PATENT DOCUMENTS

| | | |
|---|---|---|
| EP | 0838765 | 4/1998 |
| EP | 0959420 | 11/1999 |

(Continued)

OTHER PUBLICATIONS

Akira Maeda, Fatiha Sadat, Masatoshi Yoshikawa, Shunsuke Uemura, Query term disambiguation for Web cross-language information retrieval using a search engine, Proceedings of the fifth international workshop on Information retrieval with Asian languages, Sep. 30-Oct. 1, 2000, Hong Kong, China, 8 pages.

(Continued)

*Primary Examiner* — Sheree Brown
(74) *Attorney, Agent, or Firm* — Fish & Richardson P.C.

(57) ABSTRACT

Methods, systems, and apparatus, including computer programs encoded on a computer storage medium, for cross-language information retrieval. In general, one aspect of the subject matter described in this specification can be embodied in methods that include the actions of identifying a structured collection of documents, the collection of documents being organized according to a hierarchy of categories; extracting entities from structured collection of document; assigning language scores to each document in the collection of documents; assigning language scores to entities based on scores of associated documents of the collection of documents; and generating a mapping between entities and language scores.

23 Claims, 11 Drawing Sheets

(56) References Cited

U.S. PATENT DOCUMENTS

| | | |
|---|---|---|
| 2006/0195481 A1 | 8/2006 | Arrouye et al. |
| 2007/0022134 A1 | 1/2007 | Zhou et al. |
| 2007/0106653 A1 | 5/2007 | Sun |
| 2007/0250494 A1 | 10/2007 | Peoples et al. |
| 2007/0288448 A1* | 12/2007 | Datta ................................ 707/5 |
| 2008/0288474 A1 | 11/2008 | Chin et al. |
| 2009/0125497 A1 | 5/2009 | Jiang et al. |
| 2009/0222437 A1 | 9/2009 | Niu et al. |

FOREIGN PATENT DOCUMENTS

| | | |
|---|---|---|
| EP | 1014278 A1 | 6/2000 |
| JP | 2007-058706 A | 3/2007 |
| WO | 02/01400 | 1/2002 |

OTHER PUBLICATIONS

International Search Report mailed Oct. 30, 2008 from corresponding International Application No. PCT/US2008/063935, 11 pages.

Supplementary European Search Report mailed May 11, 2010 from corresponding International Application No. PCT/US2008063935, 3 pages.

Office Action mailed Jun. 24, 2010 from corresponding Chinese Patent Application No. 200880024748.8, 10 pages.

* cited by examiner

LANGUAGE SELECTION FOR INFORMATION RETRIEVAL

CROSS-REFERENCE TO RELATED APPLICATIONS

This application claims the benefit under 35 U.S.C. §119(e) of the filing date of U.S. Provisional Patent Application No. 61/416,721, for Automatic Language Selection for Information Retrieval, which was filed on Nov. 23, 2010, and which is incorporated here by reference.

BACKGROUND

The subject matter of this specification relates generally to cross-language information retrieval.

Internet search engines aim to identify resources (e.g., web pages, images, text documents, multimedia context) that are relevant to a user's needs and to provide information about the resources in a manner that is most useful to the user. Internet search engines return a set of search results in response to a user submitted query.

With the increasing number of non-English language users and content providers, there is a significant amount of non-English content on the web. An English speaker can benefit from access to the information and knowledge contained in the non-English content, and vice versa. Conventional machine translation tools can be used to translate content from one language to another language when a source and target language are known.

SUMMARY

This specification describes technologies relating to cross-language information retrieval.

Cross-language information retrieval can be performed without a user specifying any particular languages to search. One or more languages can be automatically selected for cross-language information retrieval for a received query. The query is translated into the one or more languages and respective searches are performed. Search results responsive to the respective queries are identified and one or more search results are provided, e.g., for presentation or display in a search results interface.

In general, one aspect of the subject matter described in this specification can be embodied in methods that include the actions of identifying a structured collection of documents, the collection of documents being organized according to a hierarchy of categories; extracting entities from structured collection of document; assigning language scores to each document in the collection of documents; assigning language scores to entities based on scores of associated documents of the collection of documents; and generating a mapping between entities and language scores. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. The method further includes extracting queries leading to documents in the structured collection of documents; and augmenting the mapping to incorporate queries associated with particular entities associated with the respective documents in the structure collection of documents. Extracting entities is based on capitalization within the structured collection of documents. Extracting entities is based on terms in the structured collection of documents that reference other content in the structured collection of documents. Assigning language scores to each document is based on a language score or scores for hierarchical categories in the structured collection of documents. The method further includes receiving a user input query and matching one or more query terms to one or more entities and using the mapping to determine language scores for the one or more query terms. The method further includes storing the mapping between entities and language scores. The mapping is stored in a table.

Particular embodiments of the subject matter described in this specification can be implemented so as to realize one or more of the following advantages. Cross-language searching is simplified for users by automatically selecting one or more languages likely to be most relevant to search. Additionally, by identifying the relevant language or languages, relevant search results can be efficiently identified. Computing resources can be focused on the selected languages allowing more resources to be devoted to improving translation quality or to adding more synonyms in the selected languages to improve information retrieval.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
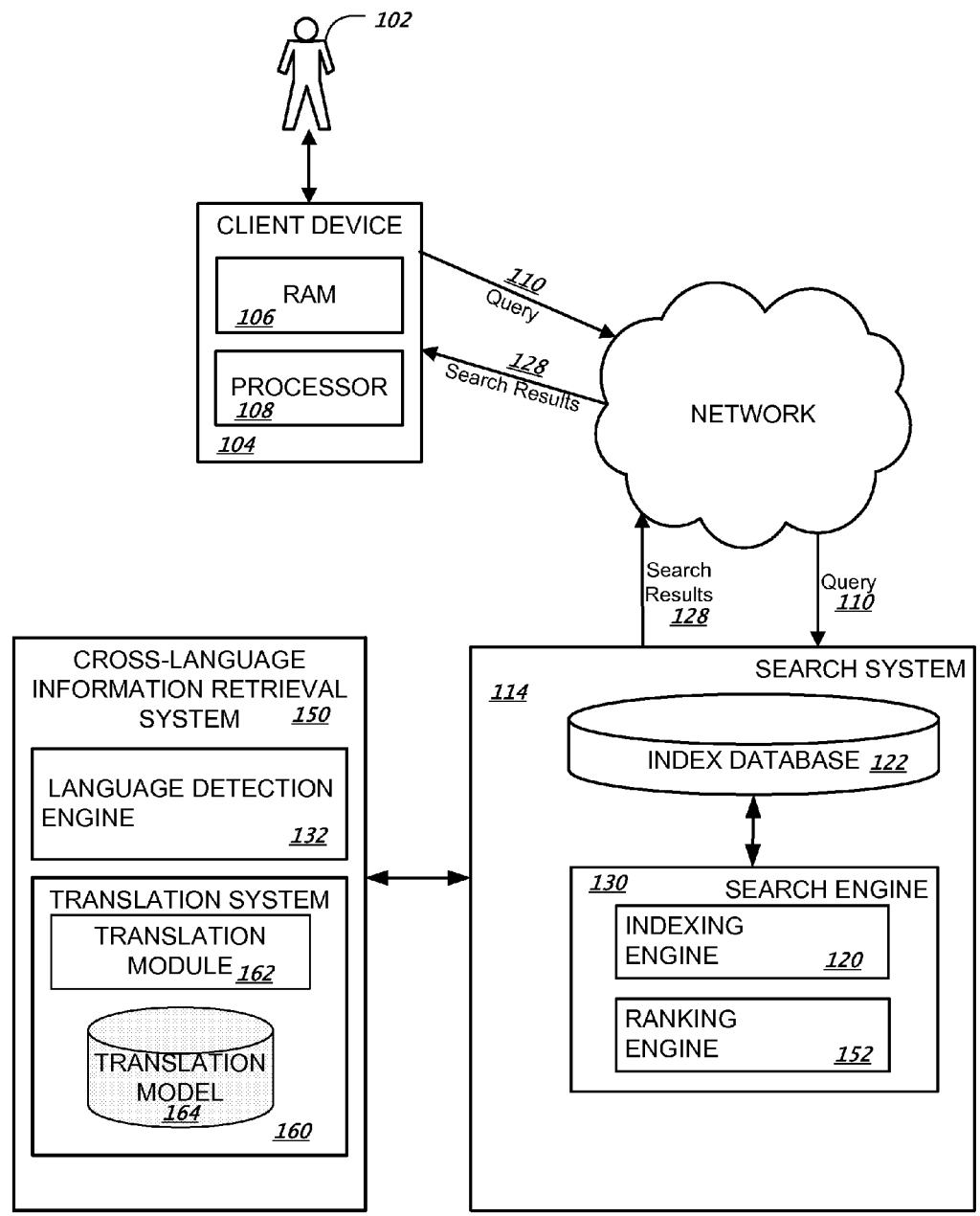
FIG. 1 is an example search system.

FIG. 1 shows an example search system 104. The search system 104 provides search results relevant to submitted queries as can be implemented in an internet, an intranet, or another client and server environment. The search system 104 is an example of an information retrieval system in which the systems, components, and techniques described below can be implemented.

A user 102 can interact with the search system 104 through a client device 104. For example, the client 104 can be a computer coupled to the search system 114 through a local area network (LAN) or wide area network (WAN), e.g., the Internet. In some implementations, the search system 114 and the client device 104 are one machine. For example, a user can install a desktop search application on the client device 104. The client device 104 will generally include a random access memory (RAM) 106 and a processor 108.

A user 102 can submit a query 110 to a search engine 130 within a search system 114. When the user 102 submits a query 110, the query 110 is transmitted through a network to the search system 114. The search system 114 can be implemented as, for example, computer programs running on one or more computers in one or more locations that are coupled to each other through a network. The search system 114 includes an index database 122 and a search engine 130. The search system 114 responds to the query 110 by generating search results 128, which are transmitted through the network to the client device 104 in a form that can be presented to the user 102 (e.g., as a search results web page to be displayed in a web browser running on the client device 104).

When the query 110 is received by the search engine 130, the search engine 130 identifies resources that match the query 110. The search engine 130 will generally include an indexing engine 120 that indexes resources (e.g., web pages, images, or news articles on the Internet) found in a corpus (e.g., a collection or repository of content), an index database 122 that stores the index information, and a ranking engine 152 (or other software) to rank the resources that match the query 110. The index database 122 can include indices for resources in multiple languages. Alternatively, a separate index database can be included in the search system 114 for each of multiple languages. The indexing and ranking of the resources can be performed using conventional techniques. The search engine 130 can transmit the search results 128 through the network to the client device 104 for presentation to the user 102.

The search system 114 interacts with a cross-language information retrieval system 150. The cross-language information system 150 includes a language detection engine 132 that identifies languages to search from the query 110 and a translation system 160. The query 110 is translated into the identified languages by the translation system 160. The translated query is then used by the search engine 130 to identify resources. Additionally, identified search results 128 can be translated by the translation system 160, for example, into the same language as the received query 110, before transmitting the search results 128 to the client device 104.

The translation system 160 includes a translation module 162 and translation model 164. The translation module 162 receives input text in one language and translates the input text into output text in another language. In some implementations, the translation system 160 also includes one or more translation models 164 (e.g., one for each language). A translation model 164 can be used by the translation module 162 during the translation process. Different translation models 164 can be used to translate different language combinations (e.g., a different translation model can be used to translate English into French than the translation model used to translate Chinese into Arabic). In some implementations, the translation system 160 stores the translations for later retrieval (e.g., in a cache or in a database).

In some alternative implementations, the cross-language information retrieval system 150 is part of the search system 114. In some other implementations, the translation system 160 is separate from the cross-language information retrieval system 150.

Figure 2:
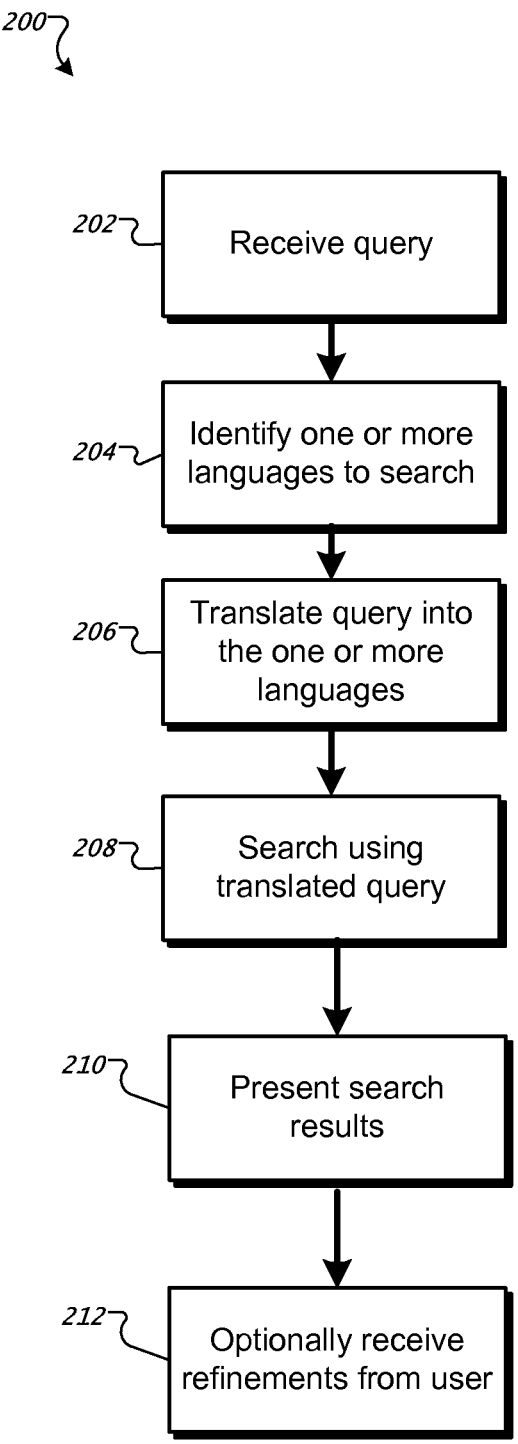
FIG. 2 is a flow diagram of an example process for providing cross-language search results.

FIG. 2 is a flow diagram of an example process 200 for providing cross-language search results. For convenience the process 200 will be describe with respect to a system or systems (e.g., search system 114 and cross-language information retrieval system 150 of FIG. 1), including one or more computing devices, that performs the process 200.

The system receives a search query (202). The search query can be received, for example, from a user through a search interface. For example, a client device can display a search interface for a search system using a browser application. In some implementations, the search query is received in response to the user entering the search query into a search field of the interface. In some other implementations, the search query is received in response to a user input indicating a cross-language search is to be performed. For example, a user can select a particular graphical element, e.g., a button or menu item, within a user interface indicating a cross-language search is to be performed. When selected, the query is submitted for cross-language searching.

In some implementations, a general search is first performed using the search query. The user can then select a cross-language search option from a search results page presenting one or more general search results. The query is then processed for cross-language searching.

The system determines one or more target languages to search (204). The system determines the one or more target languages to search based on language scores calculated for one or more terms related to the query. In some implementations, the query terms are included in the related terms. Target languages refer to languages of resources likely to be relevant to the query submitted in a source language. The system can determine the one or more target languages to search automatically so that a user does not need to indicate which target languages to search.

The system translates the query into the identified one or more languages (206). In some implementations, the query is translated using a statistical machine translation system. Conventional statistical machine translation systems use statistical models to translate text from a source language (e.g., the input query) to a target language (e.g., the query in another language). For example, for search query "bicycle rental brussels" the languages identified to search can include French and Dutch, which represent the most common languages in Belgium, where the city of Brussels is located. The query "bicycle rental brussels" is translated into a corresponding French language query: "Bruxelles Location de vélos" and a corresponding Dutch language query: "fietsverhuur brusse".

The system determines responsive results using the one or more translated queries (208). For example, searches can be performed to identify resources matching the language of the query for each of the translated queries. Thus, French language resources can be searched responsive to the French query and Dutch language resources can be searched responsive to the Dutch query. For example, one or more index databases can be maintained by a search system for each language or for one or more languages. Alternatively, the search query can be applied across all languages where resources in other languages are unlikely to be responsive to the translated search queries.

The system provides search results (210). The search results can be provided, e.g., for presentation by a user device, in various ways. Each search result can be associated with a score where only a specified number of top scoring results are provided for presentation. In some implementations, one or more search results for each search query (e.g., for each language) are provided separately in a ranked order. In some alternative implementations, search results are interleaved before providing one or more search results. The search results can be interleaved according to their respective scores in order to generate a single ranked list of search results. A user device can present the one or more search results (e.g., using a browser) according to the ordering provided by the system.

In some implementations, the search results are translated prior to being provided for presentation (e.g., into the language of the query or another user specified language). For example, search results can be generated by the search system responsive to a received query in a target language. The results (e.g., a title identifying a particular resource and a snippet of text from the resource) can then be translated to the designated language for providing the search results.

The system optionally receives refinements from the user (212). The received refinements can relate to search refinements. For example, a user can add additional languages to search. The added language results in a new translated query being searched. This can change the search results. The user can also remove a language to search. This causes those search results in that language, responsive to the query in the removed language, to be removed from the previously provided search results. The user can edit the query directly, e.g., in an edit field that allows the user to change the query. The search is performed using the modified query and search results provided according to ranked scores.

The received refinements can also relate to presentation refinements. For example, the system can also provide the original target language version of the search results. In some implementations, the user can individually and independently select particular search results to present the corresponding target language search result. The target language search result can be presented inline below the translated search result, without changing any other search results, or can be presented in a separate portion of a user interface presenting the search results.

Figure 3:
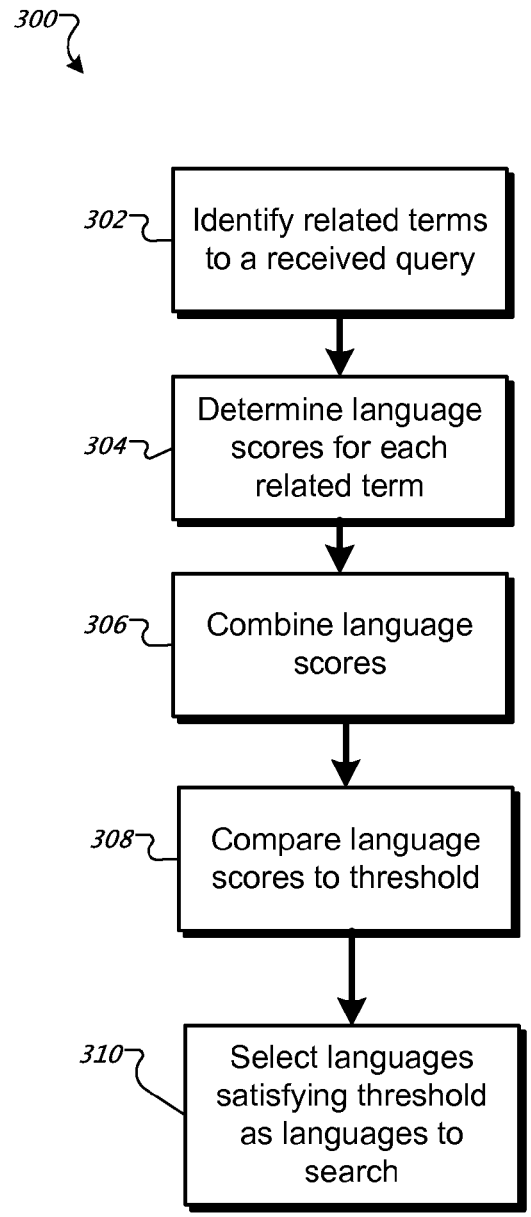
FIG. 3 is a block diagram providing a graphical overview of query processing to identify languages to search.

FIG. 3 is a flow diagram of an example process 300 for automatically identifying languages relevant to a received query. For convenience the process 300 will be described with respect to a system or systems, including one or more computing devices, that perform the process 300.

The system identifies related terms for a received query 302. The related terms can be one or more characters or words that are likely to co-occur with one or more terms of the query. In some implementations, related terms for the query are identified following a synonym expansion of the query. For example, synonyms for each query term or phrase can be identified and joined to the query such that the related terms are based on the query terms and synonyms.

The system determines language scores for each related terms 304. The language scores indicate how related the term is to particular languages. For example, a higher language score can indicate the term is more related to the language than a lower score. Some terms can have a zero language score either because they are not associated with any language or because they are associated with many languages such that it is not an effective indicator. The language scores can be determined in a number of different ways. For example, the related terms can be compared to a collection of terms having associated language scores. For example, a table or database keyed to terms can map terms to language scores for one or more languages. A given term can have a particular score for one or more languages. In some implementations, the query terms are included with the related terms. Thus, the system determines a language score for the actual query terms in addition to the related terms.

The association between terms and language scores can be precomputed and stored for runtime retrieval. A term can include the translations of that term in different languages. The language score can be based on, for example, the co-occurrence of the term in a collection of documents associated with a particular language or languages. A term that occurs more often in documents associated with a particular language and few times in documents associated with other languages can be given a greater score than a term that occurs often in documents associated with different languages (e.g., indicating a more general term, for example, "cuisine"). An example of generating an association between terms and language scores is described with respect to FIG. 5 below.

In some alternative implementations, the system determines language scores based on an analysis of how often the related terms are issued as part of queries in a given language. For example, query logs from a particular language can be used to determine how often the term occurs in that language.

The system combines the language scores 306. The language scores can be combined, for example, by summing the language score for each related term according to language. Thus, a summed score per language for one or more languages can be calculated. In some implementations, the scores are normalized. The normalization brings the language scores into a consistent range such that a threshold can be used to determine that a term is not common across languages. For example, the term "happy" should not be associated with any specific language since the word "happy" (as translated) occurs in most languages. Thus, after normalization, it can be determined which language scores are roughly the same relative to each other (common across languages) and eliminated from pointing to particular languages (e.g., 1/N where N is the number of languages that are supported by the system).

The system compares language scores to a specified threshold value 308. In some implementations, a single threshold score value is used. In some other implementations, each language has a separate threshold score. Languages that satisfy the threshold are selected as language to search 310. For example, if the language score for a particular language exceeds a threshold score value for that language, then that language is selected. However, if the language score does not exceed the threshold value for that language, then the language is not selected. The selected languages are then used to search including translating the query to the selected languages and searching for resources responsive to the translated queries, as discussed above with respect to FIG. 2.

Figure 4:
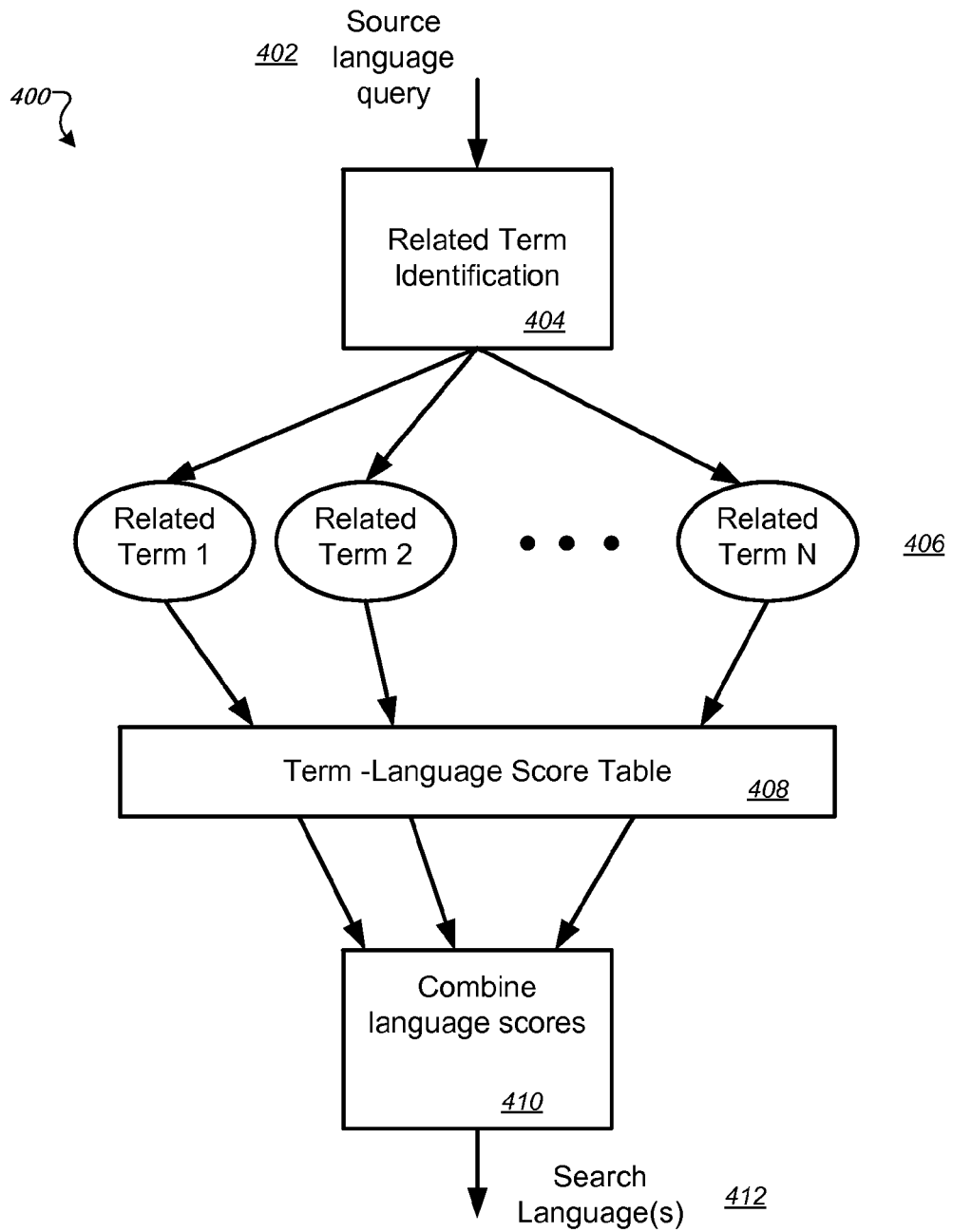
FIG. 4 is a flow diagram of an example process for automatically identifying languages relevant to a received query.

FIG. 4 is a block diagram 400 providing a graphical overview of query processing to identify languages to search using a table mapping terms to language scores. The query processing can be performed, for example, by a cross-language information retrieval system. A received query (402) is processed to identify related terms (404). The related terms are those that occur frequently with one or more of the query terms. For example, for the query "Eiffel tower" related terms can be "France", "Paris" and "French" as frequently co-occurring terms. In some implementations, frequently co-occurring terms are identified using query logs for terms that contain both the received query and the co-occurring terms. In some other implementations, the frequently co-occurring terms are identified using web documents that contain both the received query and the co-occurring terms.

Each of the related terms (406), which can include terms from the query itself, are then matched to language scores. In particular, the related terms can be compared with entries in a table (408) that maps terms to calculated language scores. For example, a given term in the table can have one or more language scores each representing a likelihood that the term is relevant to the particular language.

For example, the term "Paris" can have a high score for the French language and a low score to every other language. Similarly, other terms can have neutral language scores. For example, related terms to the query "curry" can include "India" "cooking" and "That". The term cooking may not have a language score as being too generic across languages. Generation of the table is described in greater detail below with respect to FIG. 5.

The various language scores for the related terms are combined (410). For example, the language scores can be summed and normalized by language. The combined scores are compared with a specified threshold score. For example, if the combined score for a particular language exceeds the threshold, the language can be selected as a language to search. Similarly, if the combined score for a particular language does not exceed the threshold, the language is not selected to search. Search languages selected because of the respective language scores are then output to be used in searching (412).

In some implementations, language scores are boosted based on one or more criteria. If the query is with respect to a particular location, the language score associated with that language can be boosted. For example, if the query is "restaurants in Bordeaux" the French language scores can be boosted because it is likely that the user is interested in local information related to Bordeaux, France.

Figure 5:
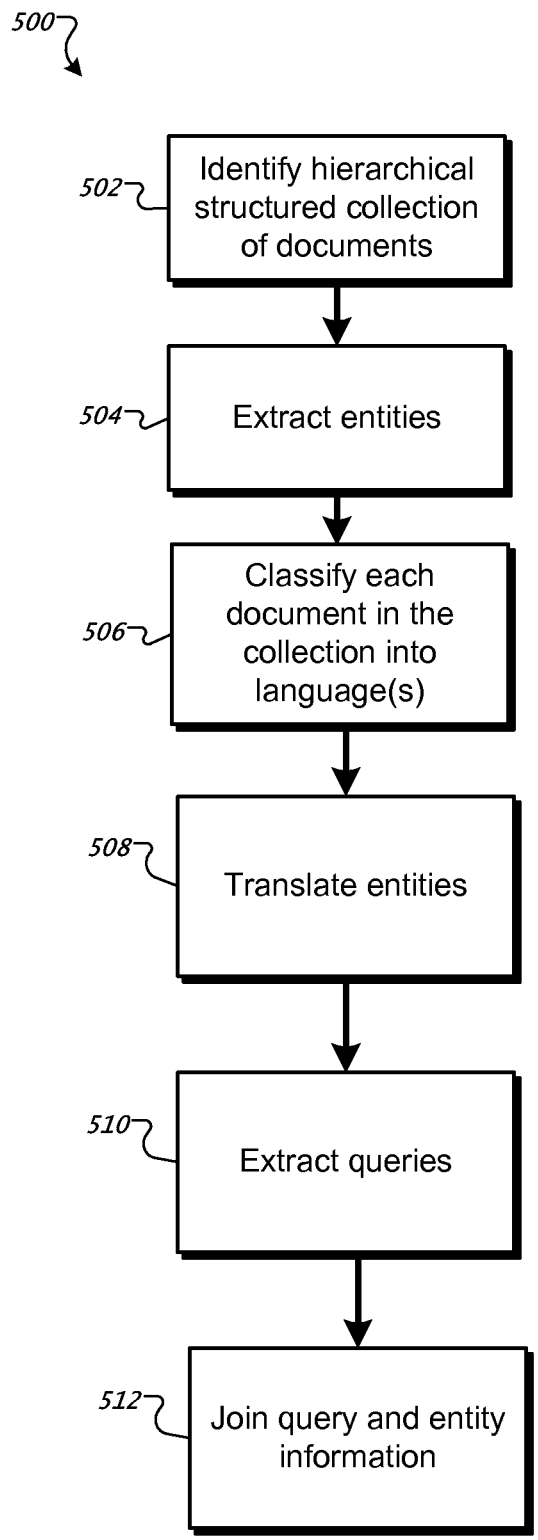
FIG. 5 is a flow diagram of an example process for relating mapping terms to languages.

FIG. 5 is a flow diagram of an example process 500 for relating mapping terms to languages. For convenience the process 500 will be describe with respect to a system or systems (e.g., a cross-language information retrieval system) including one or more computing devices that performs the process 500.

The system identifies a structured collection of documents 502. The structured collection of documents are organized according to a hierarchical set of categories. In particular, the identified structured collection of documents has already been organized according to categories, e.g., by one or more third parties. For example, an online encyclopedia (e.g., Wikipedia) includes a category hierarchy by which document entries (e.g., web pages on particular topics) are organized. Each document in the collection of documents can include a tag (e.g., as assigned by a third party) with one or more categories from a hierarchy of categories.

Entities are extracted from the structured collection of documents 504. In some implementations, entities are detected using capitalization within the collection of documents. For example, capitalization can be used to identify proper nouns (e.g., names, locations) from within the structured collection of documents. Additionally, the collection of documents can include terms that reference, e.g., using a hyperlink, other content in the collection of structured documents. These linked terms can also indicate entities. For example, "George W. Bush" is capitalized and typically listed as a link in the collection of documents. Thus, George W. Bush can be extracted as an entity. In some other implementations, titles of documents are also extracted as entities. Other entity extraction techniques can be used that are separate from the language classification. For example, entity extraction techniques include regular expression patterns and part of speech parsing/recognition.

Each document in the structured collection of documents is classified into languages 506. Documents are classified into languages based on a language score or scores for existing hierarchical categories in the structured collection of documents. For example, each document has been tagged with a category as described above. The category corresponds to a category within a hierarchical collection of categories. Language scores can be assigned to seed categories, which can be propagated to categories in the hierarchy. For example, each country can have a corresponding category (e.g., Category: China) assignment within the structured collection of documents. A corresponding language score can be assigned to each country (e.g., assigning a Chinese language score to the Category: China). A decay function can be applied to subcategories in order to account for the possible reduced relevance to the particular language the further away in the hierarchy that a category is.

For example, the document "sushi" can belong to the category "Japanese cuisine," which is a sub-category of "Japanese culture," which in turn is a sub-category of "Japan." Thus, the hierarchical category levels are Japan Japanese culture Japanese cuisine. At each sub layer, a language score can be discounted by some specified amount as the distance from Category: Japan, with an assigned language score, increases. In some implementations, assigning language scores to base categories of countries (e.g., Japan, China) and languages (e.g., English, Chinese) leads to the assignment of language scores to a majority of the documents in the collection of documents. In some implementations, some special categories require additional processing. For example, regular expression patterns can be used identify these categories and override assigned language scores with manually assigned scores (e.g., for Category: Fictional German People should not be associated with a German language assignment). Additionally, as described above, normalization of language scores identifies entities that are generally applicable across languages, and thus should not suggest a particular language to search.

A document can be tagged with more than one category. The language scores for each tagged category can be summed (per language) to obtain the score for the document. In some implementations, a vector of language scores is generated for each document in the collection of documents. Extracted entities are associated with language scores based on the language scores assigned to the documents they are associated with. For example, if the entity "yellowtail" is an entity found in the document "sushi", then the entity "yellowtail" can be assigned a language score for Japanese based on the score of the document "sushi."

The system translates the extracted entities 508. The extracted entities are translated into languages for which the cross-language information system should be triggered. In particular, the system uses a separate triggering mechanism to determine whether or not content in that language should be identified and translated in response to a cross-language search. For example, the Hindi language might be a good language to select (along with English and the other Indic languages) for a query "india laws", but the quality of the web documents in Hindi might not justify showing documents translated from Hindi as they may be of poor quality.

In some implementations, additional text from the structured collection of documents is translated. In particular, titles of documents assigned a language score can be translated similarly to the entities. For example, the document titled "curry" may not represent an entity, but the document can be tagged with categories assigned a language score. The translation can be performed, for example, using a statistical machine translation system, translation dictionaries, or other translation technique.

The system generates a mapping between entity terms and assigned language scores 510. For example, a table can be generated keyed to terms corresponding to entities and having values corresponding to the respective language scores assigned to the entity. For example, the entity "curry" can have language score values for Indian and Thai. In some implementations, any other languages are presumed to have a score of zero. In some other implementations, each other language supported by the system includes a zero value in the table. At runtime a user input query, or one or more terms from the input query, is matched to one or more entity terms in the table to identify corresponding language scores.

The system optionally extracts queries leading to documents in the structured collection of documents 512. Query logs can be used to identify queries that occur with a specified frequency to refine or expand the mapping between terms and language scores. The query data can be obtained from anonymized query logs identifying issued queries in a search interface.

The system joins the query and entity data 514. The query data is added to create an expanded mapping between terms and languages. In particular, the queries can be used to provide additional terms that map to corresponding language scores according to an association between the queries and entities in the mapping. The expanded mapping can be generated that is keyed to the extracted queries as additional terms. For a given query, the mapping identifies specific language scores assigned to the entities and titles in the target document of the collection of documents. During runtime, the related terms identified from an input query, as described above, are matched to terms corresponding to the queries to identify corresponding language scores.

Figure 6:
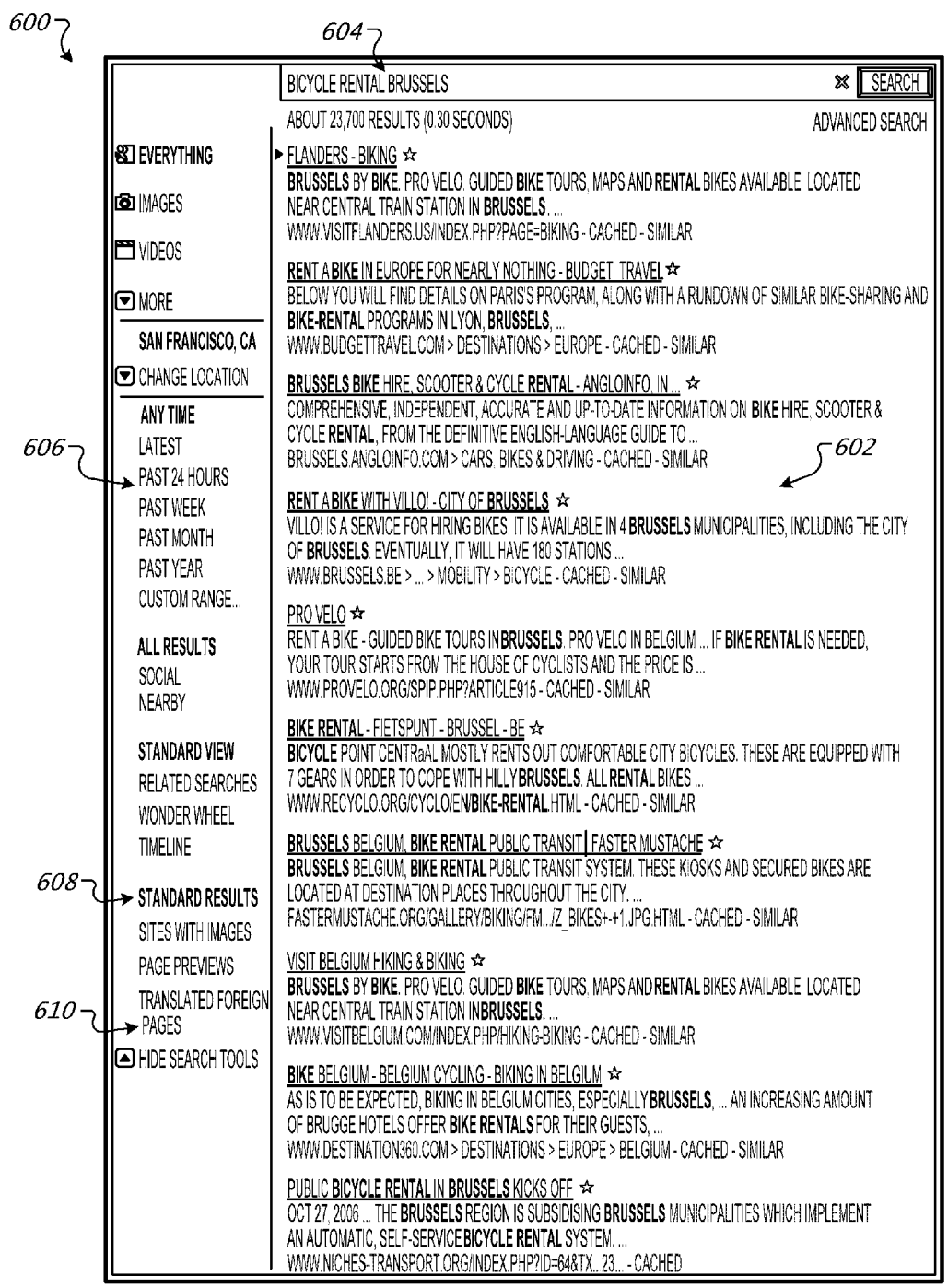
FIG. 6 is a representation of an example search results page without cross-language searching.

FIG. 6 is a representation of an example search results page 600 without cross-language searching. The search results page 600 includes a listing of search results 602 responsive to the query 604 "bicycle rental brussles." In particular, the search results 602 were obtained without cross-language searching. Consequently, all of the search results 602 are in the same language as the query 604 (e.g., English). However, since Brussels is a city in Belgium, the English only pages may not provide the user with the most relevant information to the query. A collection of menu items 606 allow the user to modify the scope of the search. In particular, the search results page 600 shows "standard results" 608 as selected. However, the user can select "translated foreign pages" 610 in order to perform a cross-language search for the query 604. The search results 602 identify resources responsive to the query. The search results 602 can include a link or other reference that allows the user to request the corresponding resource. Additionally, each search result includes an excerpt, e.g., a snippet, of text from the resource.

Figure 7:
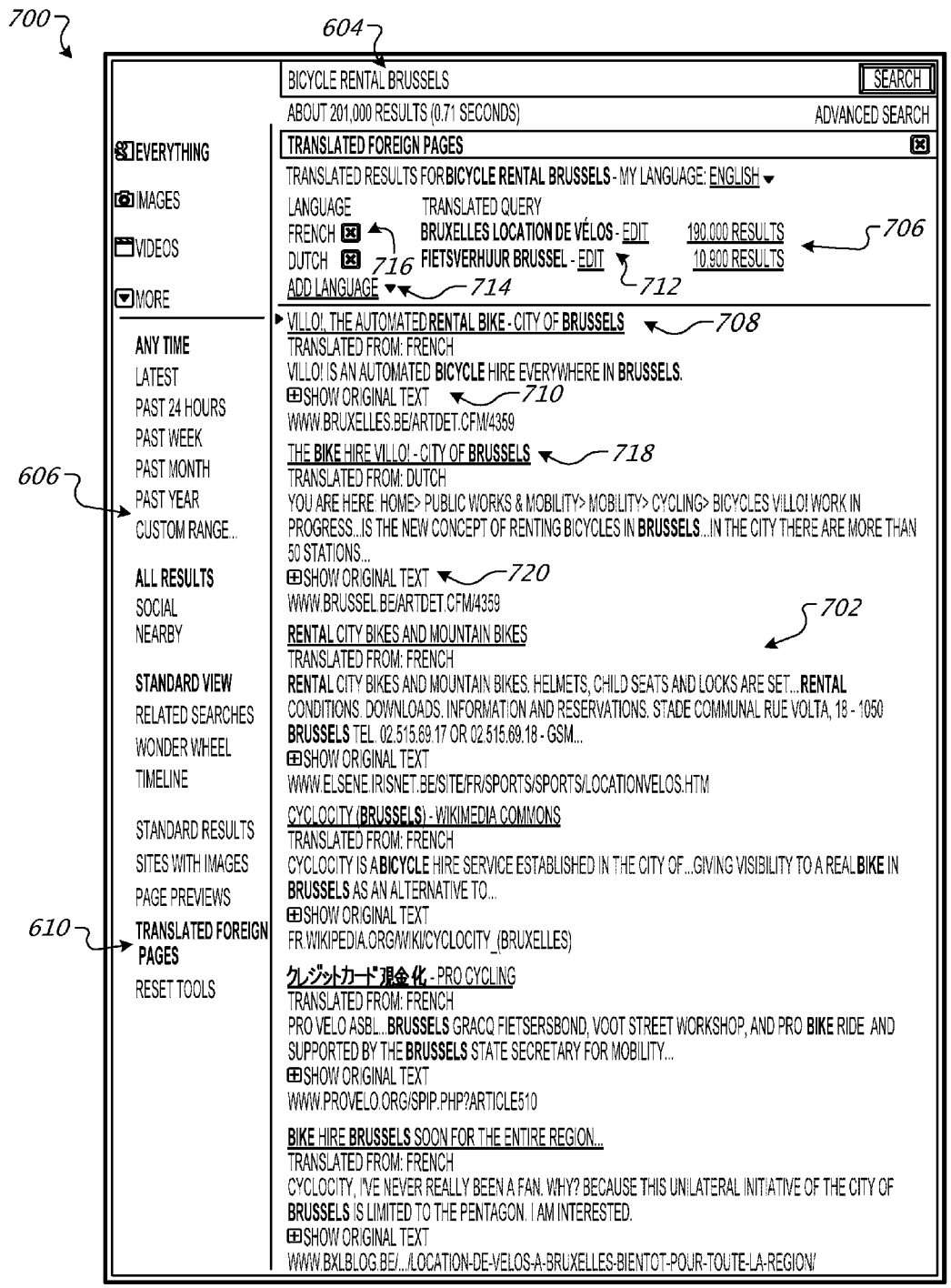
FIG. 7 is a representation of an example search results page including cross-language search results.

FIG. 7 is a representation of an example search results page 700 including cross-language search results 702. As shown in the search results page 700, the user has selected "translated foreign pages" 610 in the collection of menu items 606. As a result, languages have been identified for searching based on the input query 604 "bicycle rental brussles." The identified languages and corresponding translated queries 706 are displayed below the input query 604. In particular, French and Dutch were identified as languages to search, for example, as described above. An edit option 712 allows a user viewing the search results page 700 to modify a corresponding translated query.

The cross-language search results 702 can be identified using the respective translated queries to search documents in the identified language. For example, the query 604 was translated in Dutch to "fietsverhuur brussel". Along with the query translation, the number of results responsive to each respective query are identified (e.g., 10,900 results for the Dutch translated query). An add languages option 714 allows the user to select additional languages into which the query can be translated while a delete box 716 allows the user to remove a language.

The cross-language search results 702 include search results translated into the language of the input query 604. The text of each search result is translated from the target language of the corresponding resource (e.g., a web page in French) to a search result in the query language (e.g., English). Additionally, translated snippet text from the resource is provided.

The target language from which each particular result was translated is identified for each individual search result. For example, search result 708 is identified as "Translated from French." Additionally, an original text option 710 allows the corresponding search result to be presented in the target language, e.g., the result in French.

Similarly, search result 718 is identified as translated from Dutch. As with search result 708, an original text option 720 allows the corresponding search result to be presented in the target language, e.g., the result in Dutch.

Figure 8:
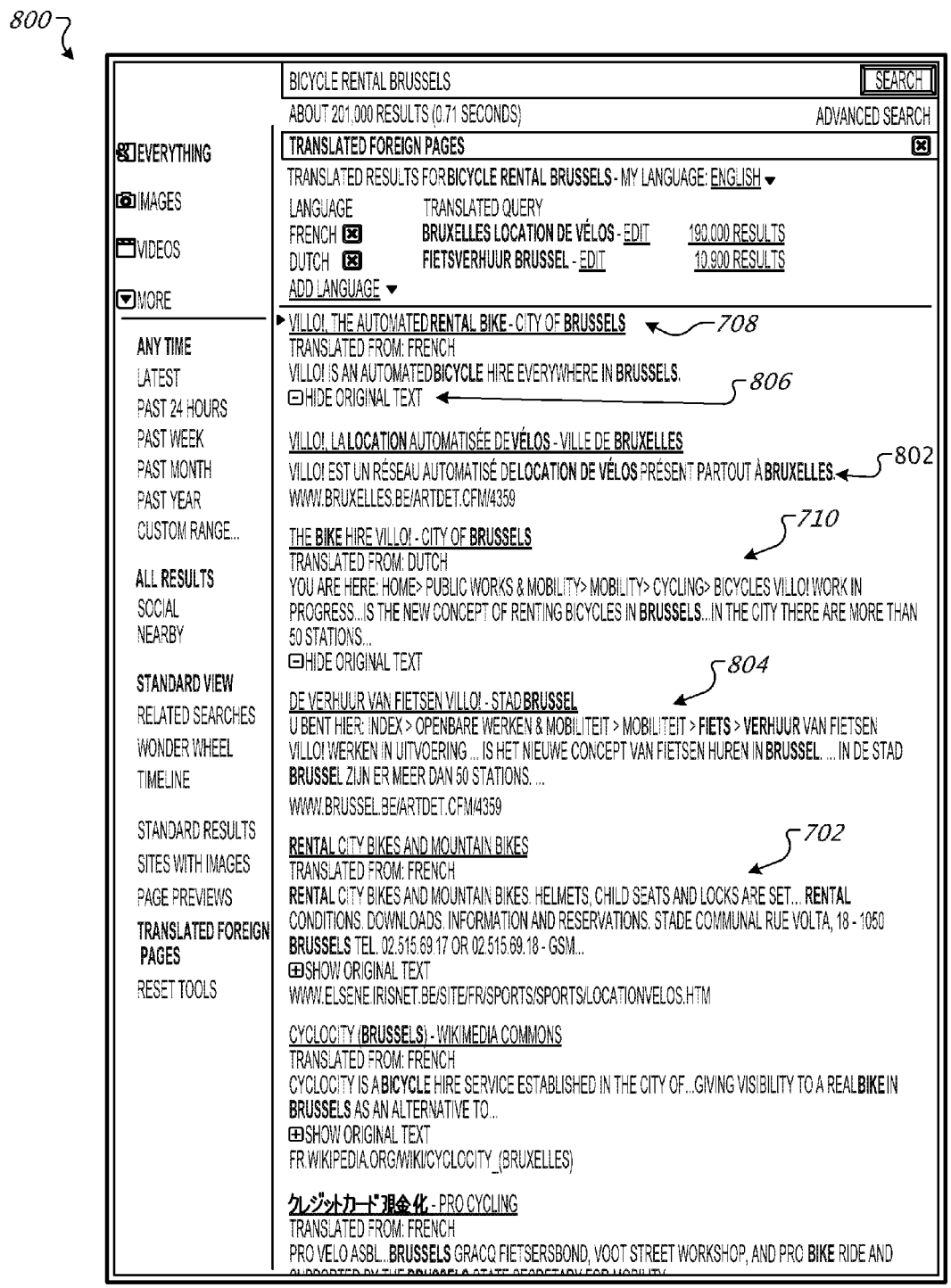
FIG. 8 is a representation of an example cross-language search results page including target language results.

FIG. 8 is a representation of an example cross-language search results page 800 including target language results. The cross-language search results page 800 shows cross-language search results 702 responsive to translated version of the input query as described with respect to FIG. 7. However, in the cross-language search results page 800, a user has selected the original text option 710 of search result 708 and original text option 720 of search result 718.

Consequently, French language result 802 is displayed inline below search result 708 and Dutch language result 804 is displayed inline below search results 718. The original language results 802 and 804 include un-translated information about the corresponding resource including an un-translated text snippet from the resource. The original language results can be selectively hidden again. For example, the user can select a "hide original text" option 806 that will cause the French language result 802 to be hidden, shifting remaining search results upward.

A selection of a translated search result (e.g., search result 708) can cause a translated version of the resource to be presented to the user (e.g., a translated web page). Similarly, a selection of an original language search result (e.g., French language result 802) can cause a version of the resource to be presented to the user retaining the original language (e.g., a web page in French).

Figure 9:
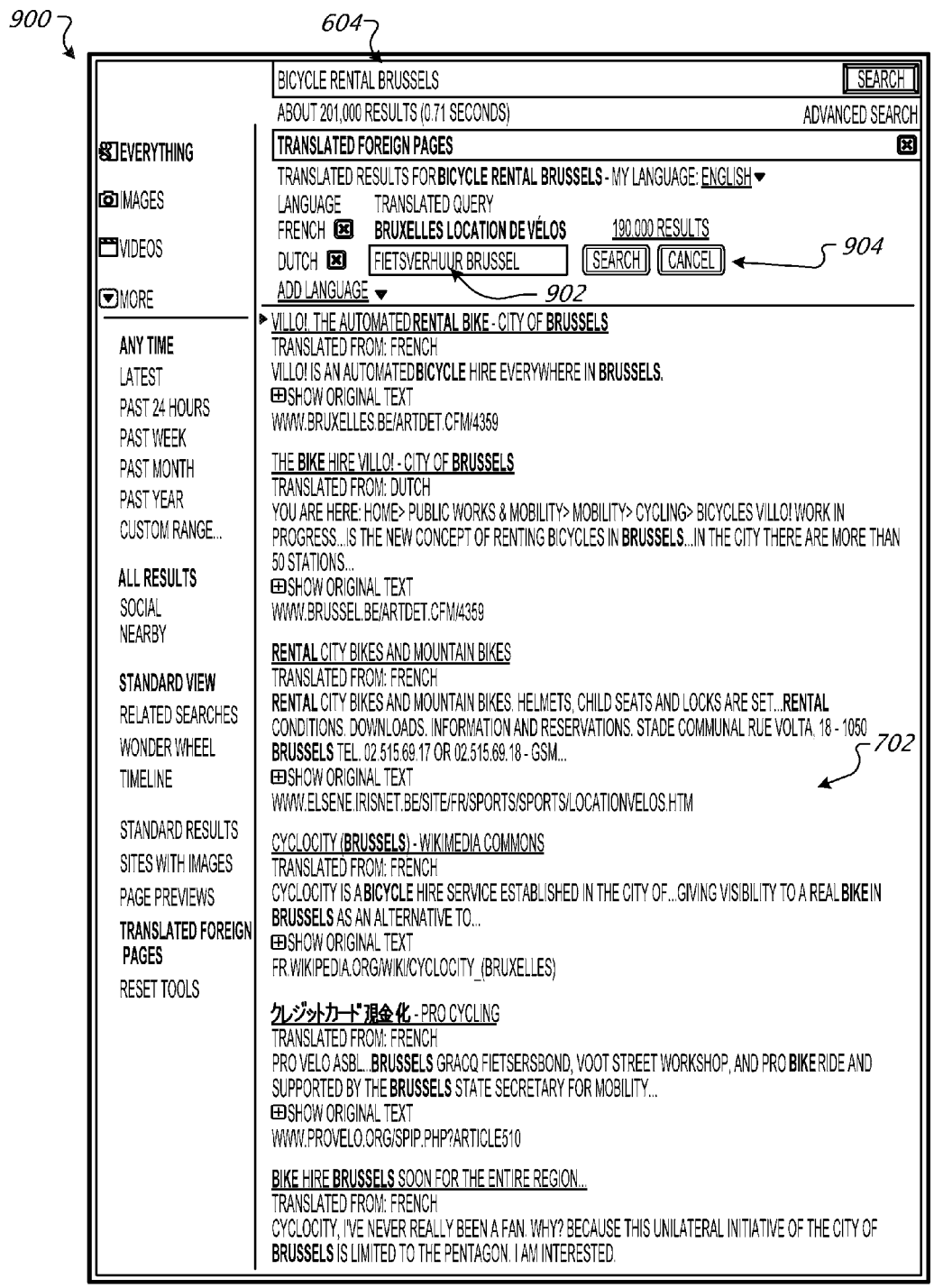
FIG. 9 is a representation of an example cross-language search results page including an editable translated query.

FIG. 9 is a representation of an example cross-language search results page 900 including an editable translated query. The cross-language search results page 900 shows cross language search results 702 responsive to translated version of the input query as described with respect to FIG. 7. However, in the cross-language search results page 900, a user has selected the edit option 712 of the identified languages and corresponding translated queries 706.

As a result, the translated query is presented within an editable field 902. For example, as shown in the search results page 900, the Dutch language translation of the search query "fietsverhuur brussel" can be modified by the user. The user can then modify the performed search using the edited query or cancel the edit using respective buttons 904. For example, the user can have some knowledge of the target language and can therefore refine the presented translation. A search can then be performed using the modified translated query and the presented search results updated accordingly.

Figure 10:
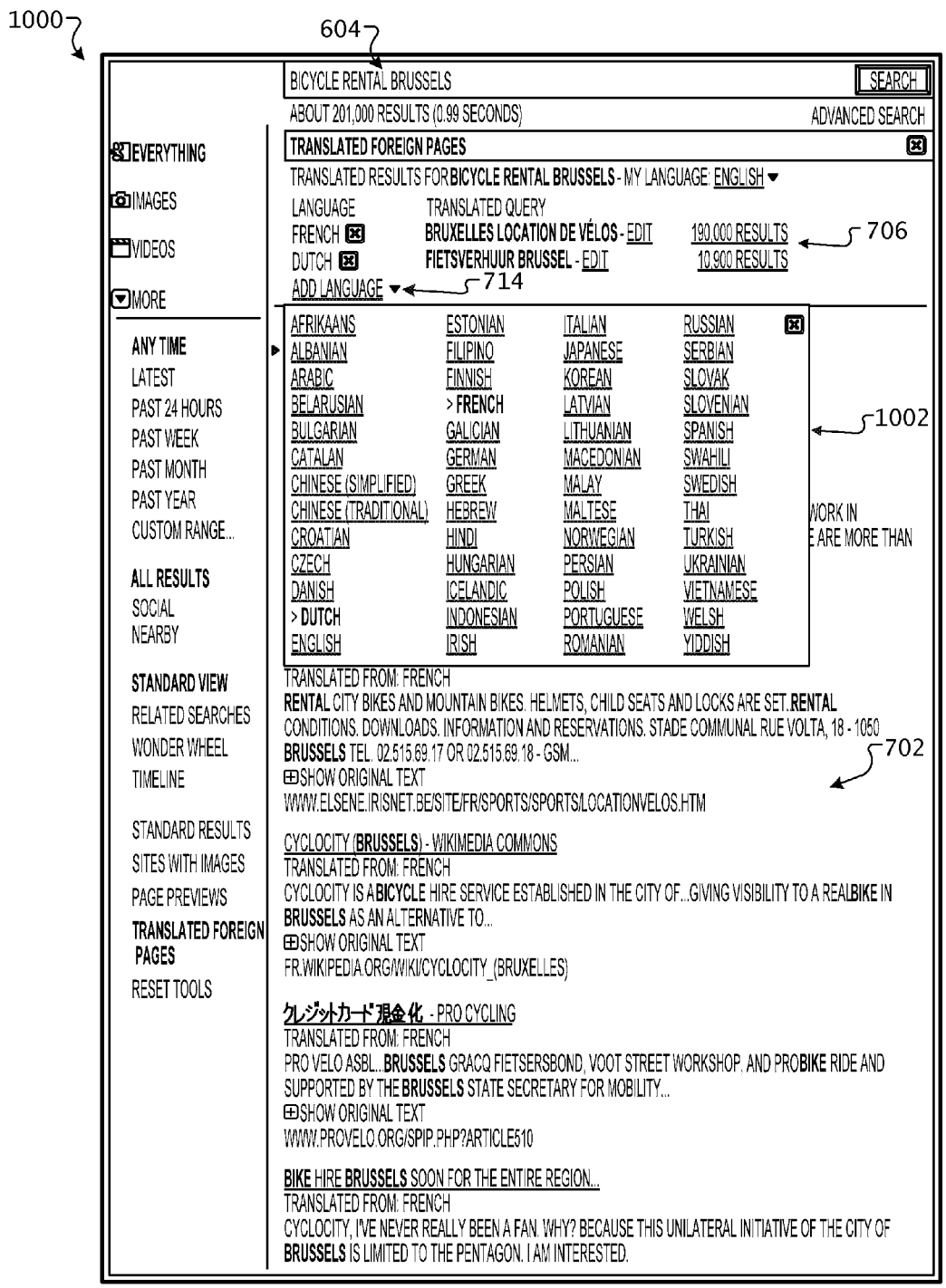
FIG. 10 is a representation of an example cross-language search results page including additional languages.

FIG. 10 is a representation of an example cross-language search results page 1000 including additional languages. The cross-language search results page 1000 shows cross-language search results 702 responsive to translated version of the input query as described with respect to FIG. 7. However, the cross-language search results page 1000 includes a selection of the add languages option 714.

In response to selecting the add languages option 714, a language panel 1002 is displayed. The language panel 1002 can be a separate window, a pop-up, or an overlay to the cross-language search results page 1000. In particular, the language panel 1002 lists languages that can be selected by the user. Additionally, the currently selected languages of Dutch and French are visually indicated. A user can select a language from the list presented in the language panel 1002. In some implementations, the user can select more than one language from the language panel 1002.

In response to a user selection of a language to add, the input query 604 can be translated into a query in that selected language and used to identify responsive search results in that language. The identified languages and corresponding translated queries 706 can be updated to indicate the additional languages including the corresponding translated query.

Figure 11:
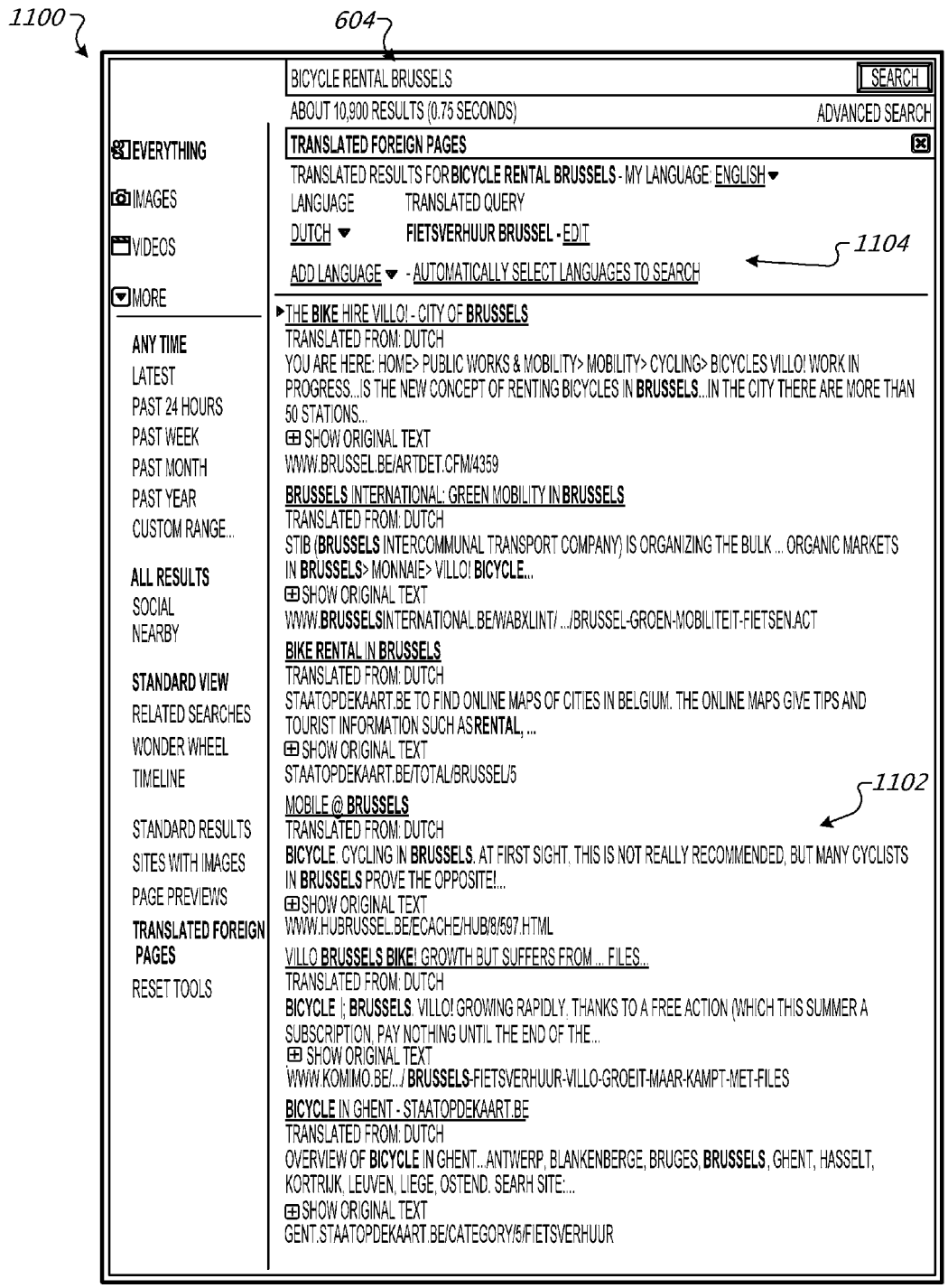
FIG. 11 is a representation of an example cross-language search results page including a removed language.

FIG. 11 is a representation of an example cross-language search results page 1100 including a removed language. The cross-language search results page 1100 shows search results 1102. However, the selected languages and translated queries 1104 identified from the input query 604 only includes a single language, in this example, Dutch.

In particular, as described with respect to FIG. 7, a delete box 716 is associated with each selected language. If the user selected the delete box 716 associated with the French language in FIG. 7, the French language query is removed leaving the Dutch language query shown in FIG. 11. Additionally, the search results 1002 are updated to reflect the language removal such that all of the search results are translated from Dutch results.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    identifying a structured collection of documents, the collection of documents being organized according to a hierarchy of categories, wherein each document is associated with a category;
    extracting entities from structured collection of documents;
    assigning language scores to each document in the collection of documents based on one or more language scores for a corresponding category within the hierarchy of categories associated with a respective document, wherein assigning language scores to each document based on language scores for the category includes:
        determining language scores for a seed category in the hierarchy, and
        assigning the language scores for the category based on a position of the category within the hierarchy, the language scores for the seed category, and a language score discount based on the distance between the category position and the seed category;
    assigning one or more language scores to each entity based on scores of associated documents of the collection of documents; and
    generating a mapping between entities and their assigned language scores.

2. The method of claim 1, further comprising:
    extracting queries leading to documents in the structured collection of documents; and
    augmenting the mapping to incorporate queries associated with particular entities associated with the respective documents in the structure collection of documents.

3. The method of claim 1, wherein extracting entities is based on capitalization within the structured collection of documents.

4. The method of claim 1, wherein extracting entities is based on terms in the structured collection of documents that reference other content in the structured collection of documents.

5. The method of claim 1, further comprising:
    receiving a user input query and matching one or more query terms to one or more entities and using the mapping to determine language scores for the one or more query terms.

6. The method of claim 1, further comprising:
storing the mapping between entities and language scores.

7. The method of claim 6, wherein the mapping is stored in a table.

8. A system comprising:
one or more computing devices operable to perform operations comprising:
identifying a structured collection of documents, the collection of documents being organized according to a hierarchy of categories, wherein each document is associated with a category;
extracting entities from structured collection of documents;
assigning language scores to each document in the collection of documents based on one or more language scores for a corresponding category within the hierarchy of categories associated with a respective document, wherein assigning language scores to each document based on language scores for the category includes:
determining language scores for a seed category in the hierarchy, and
assigning the language scores for the category based on a position of the category within the hierarchy, the language scores for the seed category, and a language score discount based on the distance between the category position and the seed category;
assigning one or more language scores to each entity based on scores of associated documents of the collection of documents; and
generating a mapping between entities and their assigned language scores.

9. The system of claim 8, further configured to perform operations comprising:
extracting queries leading to documents in the structured collection of documents; and
augmenting the mapping to incorporate queries associated with particular entities associated with the respective documents in the structure collection of documents.

10. The system of claim 8, wherein extracting entities is based on capitalization within the structured collection of documents.

11. The system of claim 8, wherein extracting entities is based on terms in the structured collection of documents that reference other content in the structured collection of documents.

12. The system of claim 8, further operable to perform operations comprising:
receiving a user input query and matching one or more query terms to one or more entities and using the mapping to determine language scores for the one or more query terms.

13. The system of claim 8, further operable to perform operations comprising:
storing the mapping between entities and language scores.

14. The system of claim 13, wherein the mapping is stored in a table.

15. A computer storage medium encoded with a computer program, the program comprising instructions that when executed by data processing apparatus cause the data processing apparatus to perform operations comprising:
identifying a structured collection of documents, the collection of documents being organized according to a hierarchy of categories, wherein each document is associated with a category;
extracting entities from structured collection of documents;
assigning language scores to each document in the collection of documents based on one or more language scores for a corresponding category within the hierarchy of categories associated with a respective document, wherein assigning language scores to each document based on language scores for the category includes:
determining language scores for a seed category in the hierarchy, and
assigning the language scores for the category based on a position of the category within the hierarchy, the language scores for the seed category, and a language score discount based on the distance between the category position and the seed category;
assigning one or more language scores to each entity based on scores of associated documents of the collection of documents; and
generating a mapping between entities and their assigned language scores.

16. The computer storage medium of claim 15, further comprising instructions to perform operations comprising:
extracting queries leading to documents in the structured collection of documents; and
augmenting the mapping to incorporate queries associated with particular entities associated with the respective documents in the structure collection of documents.

17. The computer storage medium of claim 15, wherein extracting entities is based on capitalization within the structured collection of documents.

18. The computer storage medium of claim 15, wherein extracting entities is based on terms in the structured collection of documents that reference other content in the structured collection of documents.

19. The computer storage medium of claim 15, further comprising instructions to perform operations comprising:
receiving a user input query and matching one or more query terms to one or more entities and using the mapping to determine language scores for the one or more query terms.

20. The computer storage medium of claim 15, further comprising instructions to perform operations comprising:
storing the mapping between entities and language scores.

21. The computer storage medium of claim 20, wherein the mapping is stored in a table.

22. The method of claim 1, wherein generating the mapping between entities and language scores comprises: generating a table keyed to terms corresponding to entities and having values corresponding to the respective language scores assigned to the entity.

23. The method of claim 1, wherein the extracted entities are translated into one or more languages.

* * * * *